US012481327B1

(12) United States Patent
Blais

(10) Patent No.: US 12,481,327 B1
(45) Date of Patent: Nov. 25, 2025

(54) MOBILE TELEPHONE CASE WITH FENCE TESTER

(71) Applicant: Alexandrine Blais, Calgary (CA)

(72) Inventor: Alexandrine Blais, Calgary (CA)

( * ) Notice: Subject to any disclaimer, the term of this patent is extended or adjusted under 35 U.S.C. 154(b) by 483 days.

(21) Appl. No.: 17/985,536

(22) Filed: Nov. 11, 2022

Related U.S. Application Data

(60) Provisional application No. 63/278,244, filed on Nov. 11, 2021.

(51) Int. Cl.
| | | |
|---|---|---|
| *G06F 1/16* | (2006.01) | |
| *G01R 1/067* | (2006.01) | |
| *G01R 19/155* | (2006.01) | |
| *H04W 4/80* | (2018.01) | |
| *H05C 3/00* | (2006.01) | |

(52) U.S. Cl.
CPC ....... *G06F 1/1656* (2013.01); *G01R 1/06788* (2013.01); *G01R 19/155* (2013.01); *H04W 4/80* (2018.02); *H05C 3/00* (2013.01)

(58) Field of Classification Search
CPC . G06F 1/1656; G01R 1/06788; G01R 19/155; H04W 4/80; H05C 3/00
See application file for complete search history.

(56) References Cited

U.S. PATENT DOCUMENTS

| | | | |
|---|---|---|---|
| 3,883,804 | A | 5/1975 | Wilson |
| 9,709,606 | B1 | 7/2017 | Cho |
| 9,829,515 | B1 | 11/2017 | Cho |
| 9,859,515 | B2 * | 1/2018 | Hammond ............. H10K 71/40 |
| 2019/0338867 | A1 * | 11/2019 | Muhr ....................... H02G 1/08 |
| 2020/0335854 | A1 * | 10/2020 | Yang ....................... H01Q 1/38 |

(Continued)

FOREIGN PATENT DOCUMENTS

NZ 609213 A * 8/2013

OTHER PUBLICATIONS

JVA MB12 Mains/Battery Electric Fence IP Energizer® 12J 120km. Product Listing [online]. © JVA Technologies [retrieved on Jul. 21, 2021]. Retrieved from the Internet: <URL: https://store.jva-fence.com.au/products/jva-mb-12?_pos=2&_sid=43fbb8c92&_ss=>.

(Continued)

*Primary Examiner* — Dhaval V Patel
(74) *Attorney, Agent, or Firm* — Cramer Patent & Design, PLLC.; Aaron R. Cramer

(57) ABSTRACT

A Mobile Telephone Case with Fence Tester is a protective case for a smart phone with an integrated electric fence tester. At the rear of the case, below the typical camera location, is a recessed electrode that runs the entire width of the case. This electrode is connected to internal circuitry which measures the high voltage output of an electric fence, used to contain livestock, when the electrode is held against the fence wire. The electronics are powered by its own internal battery, and the output from the internal circuitry is connected to a Bluetooth® transmitter which allows the voltage to be displayed on the phone screen via a specialized app. In such a manner, no direct electrical connection is made between the tester and the smart phone. An alternate version may also have a dedicated LCD screen on the rear of the case. The use of the Mobile Telephone Case with Fence Tester provides farmers and ranchers the ability to test electric fences at almost any time.

1 Claim, 5 Drawing Sheets

(56) References Cited

U.S. PATENT DOCUMENTS

2021/0399567 A1* 12/2021 Yamaguchi ............ H02J 7/0049
2022/0370663 A1* 11/2022 Bazzi ........................ A61L 2/22

OTHER PUBLICATIONS

Rutland Digital Electric Fence Tester. Product Listing [online]. Chelford Farm Supplies © 2020 [retrieved on Jul. 21, 2021]. Retrieved from the Internet: <URL: https://www.chelfordfarmsupplies.co.uk/rutland-digital-electric-fence-tester>.

New Rappa Digital Voltmeter. Product Listing [online]. Rappa [retrieved on Jul. 21, 2021]. Retrieved from the Internet: <URL: https://www.rappa.co.uk/products/392-new-rappa-digital-voltmeter>.

Gallagher Smartfix Fault Finders | 15 Pack. Product Listing [online]. © 2022 Gallagher Electric Fence Products from Valley Farm Supply [retrieved on Jul. 21, 2021]. Retrieved from the Internet: <URL: https://valleyfarmsupply.net/products/copy-of-smartfix-fault-finder-tester>.

\* cited by examiner

MOBILE TELEPHONE CASE WITH FENCE TESTER

RELATED APPLICATIONS

The present invention is a continuation-in-part and claims the benefit of U.S. Provisional Patent Application No. 63/278,244 filed on Nov. 11, 2021, the entire disclosures of which are incorporated herein by reference.

FIELD OF THE INVENTION

The present invention relates generally to a mobile telephone case and more specifically to a mobile telephone case with a fence tester.

BACKGROUND OF THE INVENTION

Today's modern mobile telephone provides users with a wide amount of versatility. No longer is it just a phone, but a GPS, a personal digital assistant, an address book and a camera. They rightly deserve the title of "smart phone". As such, they are always on or near a user's person. Almost no one will leave their house without their keys, wallet, and now their smart phone. The same cannot be held true however for other devices and tools one may need throughout the day.

One (1) area where this becomes especially evident is for the rancher or farmer who keeps livestock within an electric fence. Such users constantly need a fence tester to make sure the fence is operating and to make sure it is off when touching or operating it. This often necessitates travel back to a shop, barn or vehicle to retrieve their fence tester, thus wasting valuable time in what is already a long day. Accordingly, there exists a need for a means by which the capabilities of an electric fence tester can be incorporated into a protective mobile telephone case to ensure that a fence tester is always handy. The development of the cell phone case with integral electric fence testing device fulfills this need.

SUMMARY OF THE INVENTION

To achieve the above and other objectives, the present invention provides for a case with integral electric fence testing device has a protective outer enclosure adapted to surround a conventional mobile telephone—the protective outer enclosure includes a plurality of outer sides, a non-transitory storage media residing on a memory of the conventional mobile telephone to determine a voltage reading on a wire of an electric fence, a tester switch actuating a plurality of internal circuitry during an actual fence testing operation, and a protective rear surface having an intrinsic electrical insulating property, the protective rear surface includes a wire channel which is adapted to accept the wire of the electric fence.

An electrode may be provided in a center portion of the wire channel to obtain the voltage reading. The electrode may be connected via a high voltage cable to a voltage comparator circuit. The wire channel may be placed onto the wire such that it contacts the electrode. The voltage comparator circuit may include a voltage signal to a Bluetooth transmitter. The voltage comparator circuit may receive the reference signal from the wire via the high voltage cable. The Bluetooth® transmitter may be in electrical communication within the non-transitory storage media to allow for a non-contact interface with the conventional mobile telephone.

The non-transitory storage media may ensure anti-shock protection for both the conventional mobile telephone and a user. The wire channel may be 2 in. wide to accommodate the wire. The wire channel may be 2 in. wide to accommodate a plurality of electrified fence tape. The protective outer enclosure may be placed on top of the wire such that easy reading of the voltage reading is performed. The voltage reading may allow for easy determination of an operating state of the electric fence. A camera opening may be disposed on the protective outer enclosure. A charging port may be adapted to be aligned with a power jack disposed on one of the outer sides of the protective outer enclosure which is electrically connected to a charging regulator. The charging regulator may provide a constant voltage to the tester switch.

A rechargeable battery may provide electrical power for the case with integral electric fence testing device. The charging regulator may provide a controlled voltage to charge the rechargeable battery. The tester switch may provide an operating current to the voltage comparator circuit and the Bluetooth® transmitter when closed. After the processing, the voltage reading may be passed to the Bluetooth® transmitter for transmission via an internal Bluetooth® antenna. The voltage reading may be transmitted by the internal Bluetooth® antenna that is picked up by the internal receiver of the mobile telephone for display and subsequent use.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
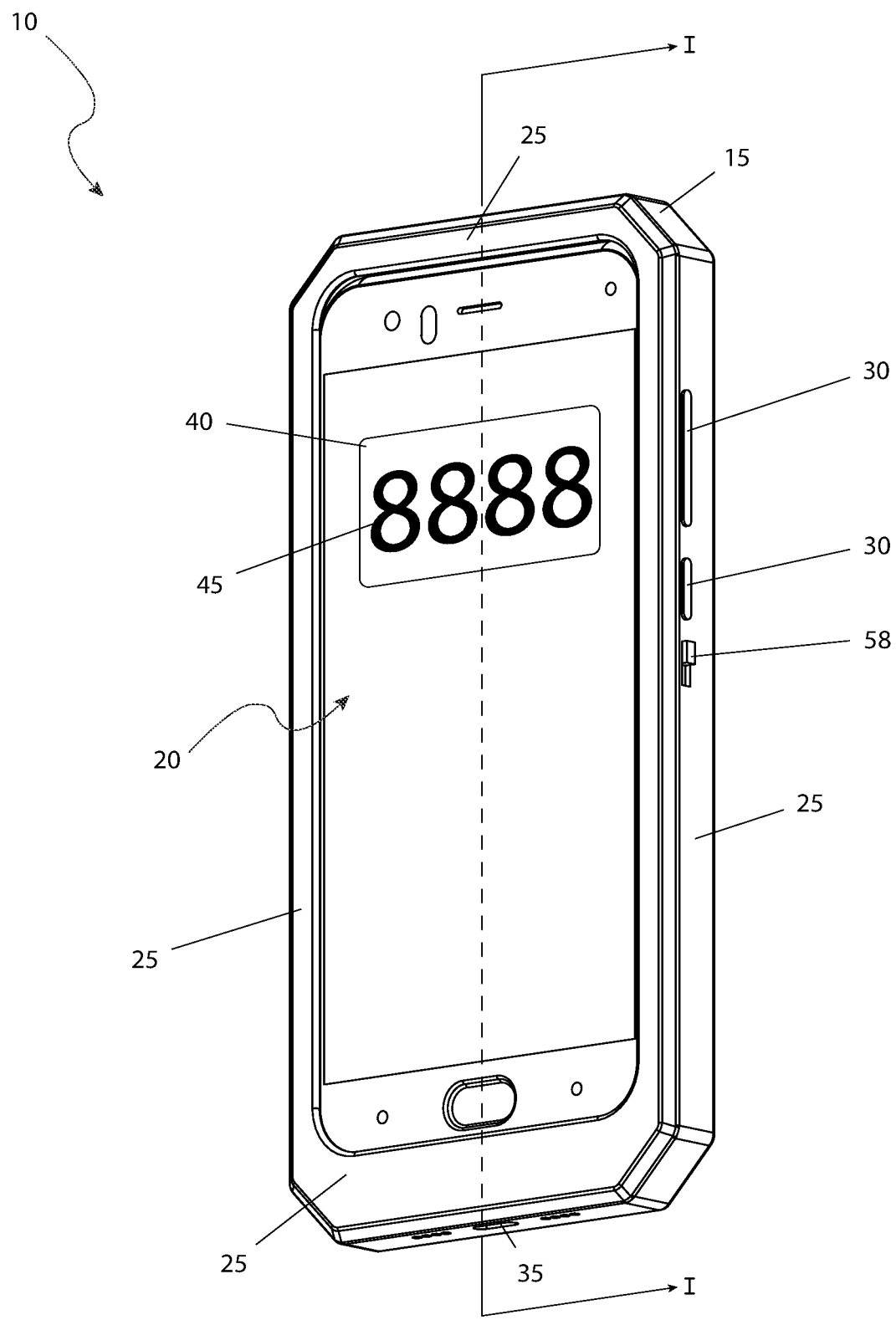
FIG. 1 is a front perspective view of a case with integral electric fence testing device, according to the preferred embodiment of the present invention.

DESCRIPTIVE KEY 10 case with integral electric fence testing device
15 protective enclosure
20 mobile telephone
25 side
30 actuation button
35 power jack
40 application
45 voltage reading
50 wire
55 electric fence
58 tester switch
60 rear surface
65 camera opening 70 wire channel
75 electrode
85 high voltage cable
90 voltage comparator circuit
95 Bluetooth® transmitter
100 charging port
105 charging regulator
110 rechargeable battery
115 insulating post
120 insulator
125 Bluetooth® antenna 1. Description of the Invention The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. Detailed Description of the Figures

Referring now to FIG. 1, a front perspective view of the case with integral electric fence testing device 10, according to the preferred embodiment of the present invention is disclosed. The case with integral electric fence testing device 10 (herein also described as the "device") 10, is particularly suited for protecting a mobile telephone 20 with an integrated electric fence tester. The invention provides for a protective outer enclosure 15 that surrounds a conventional mobile telephone 20. The protective outer enclosure 15 includes outer sides 25 and includes provisions for actuation buttons 30 and power jacks 35. The device 10 would be made in multiple versions to accommodate all makes and models of mobile telephones 20. The mobile telephone 20 is capable of running a dedicated application or a non-transitory storage media 40 capable of displaying a voltage reading 45 as is present on a wire 50 of an electric fence 55 (the wire 50 and electric fence 55 are not shown in this figure and will be described in greater detail herein below). It is noted that the overall thickness of the protective outer enclosure 15 would be slightly thicker than a conventional protective case due to internal electrical components contained within the protective outer enclosure 15 as will be described herein below. A tester switch 58 is provided for actuating the internal circuitry of the device 10 during actual fence testing operations. The tester switch 58 would be placed in the off position when the device 10 is not being used so as to conserve the internal rechargeable battery 110 (the rechargeable battery 110 is not shown in this figure and will be described in greater detail herein below).

Figure 2:
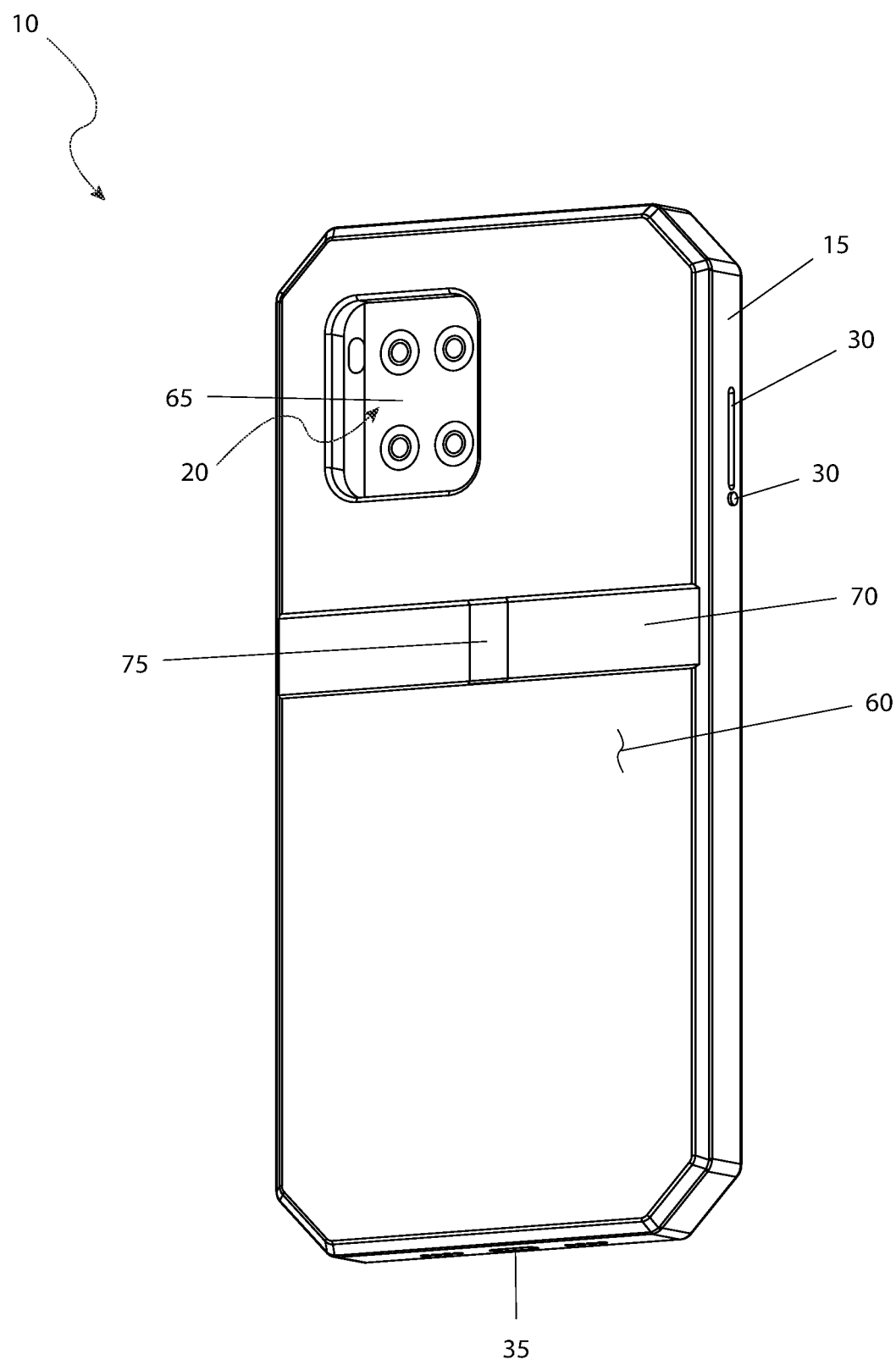
FIG. 2 is a rear perspective view of a case with integral electric fence testing device, according to the preferred embodiment of the present invention.

Referring next to FIG. 2, a rear perspective view of the device 10, according to the preferred embodiment of the present invention is depicted. The device 10 provides for a protective rear surface 60. The rear surface 60 also has intrinsic electrical insulating properties. The device 10 provides necessary camera opening 65 whose location and size will vary per make and model of the mobile telephone 20 (as shown in FIG. 1). Additional actuation buttons 30 are provided on the sides 25 as necessary to operate the mobile telephone 20 in a conventional manner. The rear surface 60 is provided with a wire channel 70 which accepts a wire 50 of an electric fence 55 (the wire 50 and electric fence 55 are not shown in this figure and will be described in greater detail herein below). An electrode 75 is provided in the center of the wire channel 70 for purpose of obtaining a voltage reading. It is noted that the wire channel 70 is of sufficient width, approximately one-half inch (½ in.) to accommodate electrified fence tape as well as wire 50.

Figure 3:
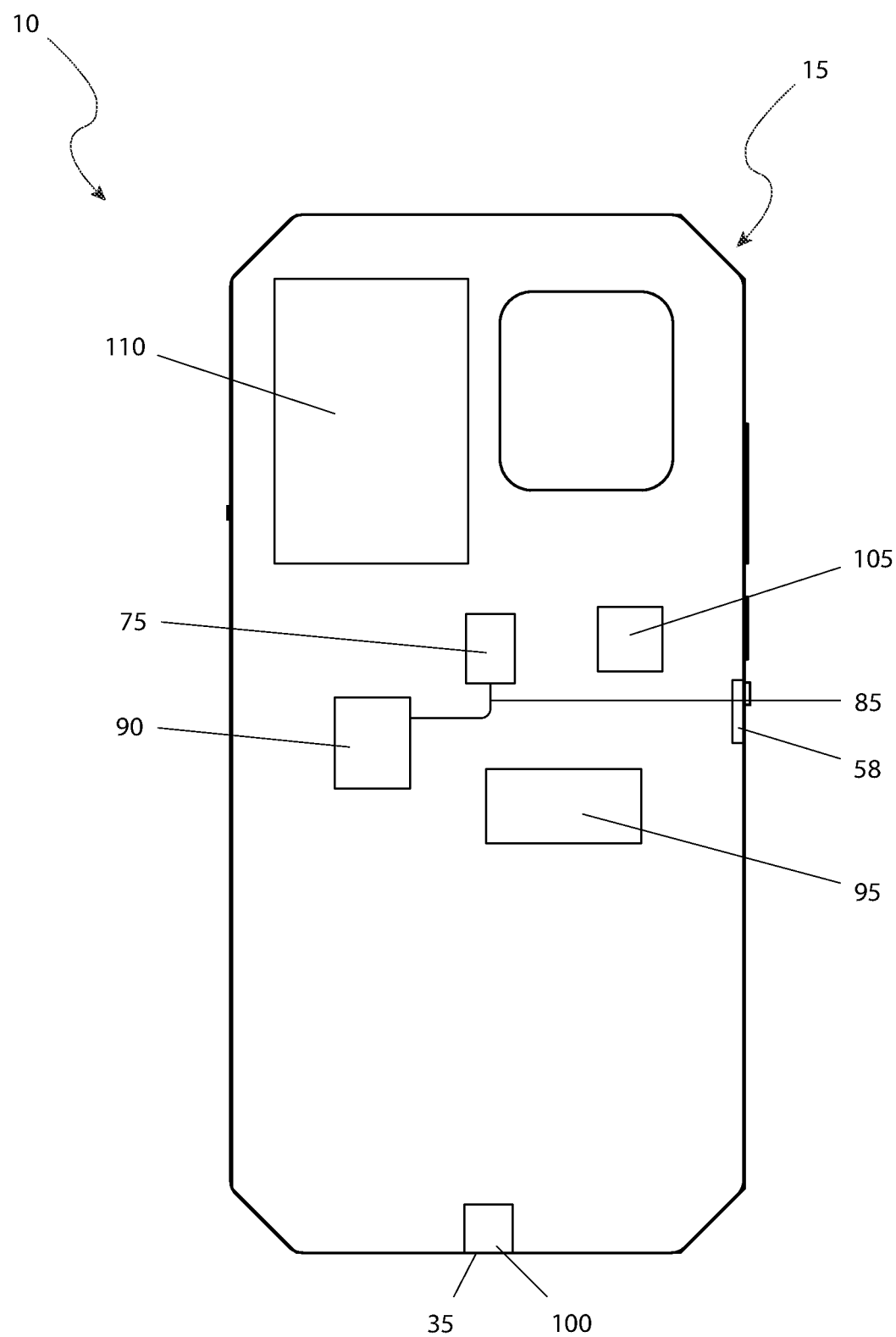
FIG. 3 is a sectional view of a case with integral electric fence testing device, as seen along a Line I-I, as shown in FIG. 1, according to the preferred embodiment of the present invention.

Referring now to FIG. 3, a sectional view of the device 10, as seen along a Line I-I, as shown in FIG. 1, according to the preferred embodiment of the present invention is shown. The electrode 75 is connected via a high voltage cable 85 to a voltage comparator circuit 90. The voltage comparator circuit 90 provides a voltage signal to a Bluetooth® transmitter 95. The Bluetooth® transmitter 95 interfaces to the application 40 (as shown in FIG. 1) thus allowing for a non-contact interface with the mobile telephone 20 (as shown in FIG. 1), thus ensuring anti-shock protection for both the mobile telephone 20 and the user. A charging port 100 is aligned with the power jack 35 and provided on the side which is electrically connected to a charging regulator 105. A rechargeable battery 110 provides power for the above-mentioned circuitry and is controlled by the tester switch 58.

Figure 4:
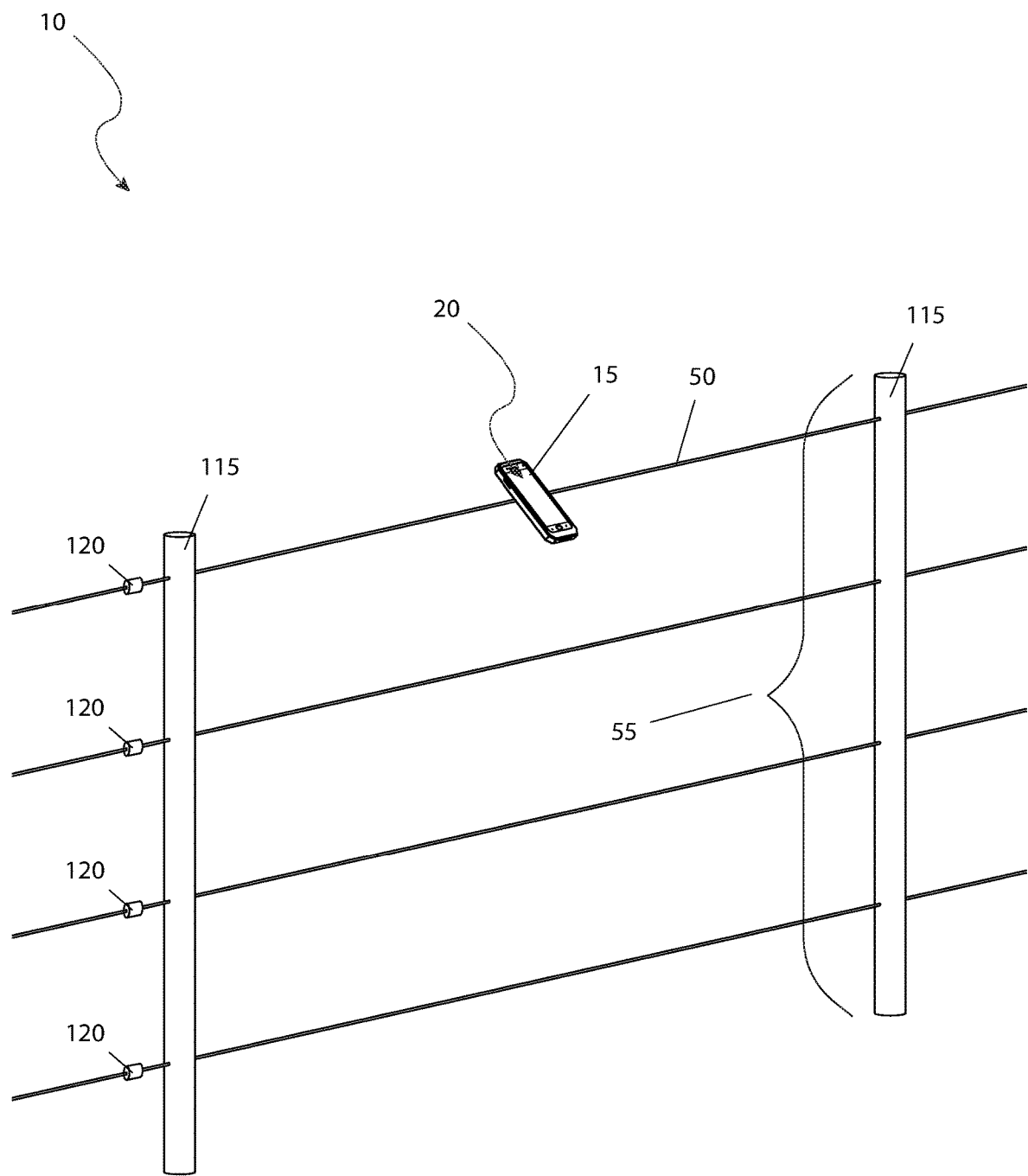
FIG. 4 is a perspective view of a case with integral electric fence testing device, shown in a utilized state, according to the preferred embodiment of the present invention; and, FIG. 5 is an electrical block diagram of a case with integral electric fence testing device, according to the preferred embodiment of the present invention.

Referring next to FIG. 4, a perspective view of the device 10, shown in a utilized state. according to the preferred embodiment of the present invention is disclosed. The device 10 is used on an electric fence 55 such as used to contain livestock. The electric fence 55 typically has insulating posts 115, wire 50 or wide fence tape (not shown), insulators 120 and associated mechanical and electrical components in a conventional and typical installation. The wire channel 70 (as shown in FIG. 2) is placed onto the wire 50 such that it contacts the electrode 75 (as shown in FIG. 2). Alternately, with the use of the application 40 (as shown in FIG. 1), the protective outer enclosure 15 may be placed on top the wire 50 such that easy reading of the voltage reading 45 (as shown in FIG. 1) may be performed. Such information provided by the voltage reading 45 allows for easy determination of the operating state of the electric fence 55.

Figure 5:
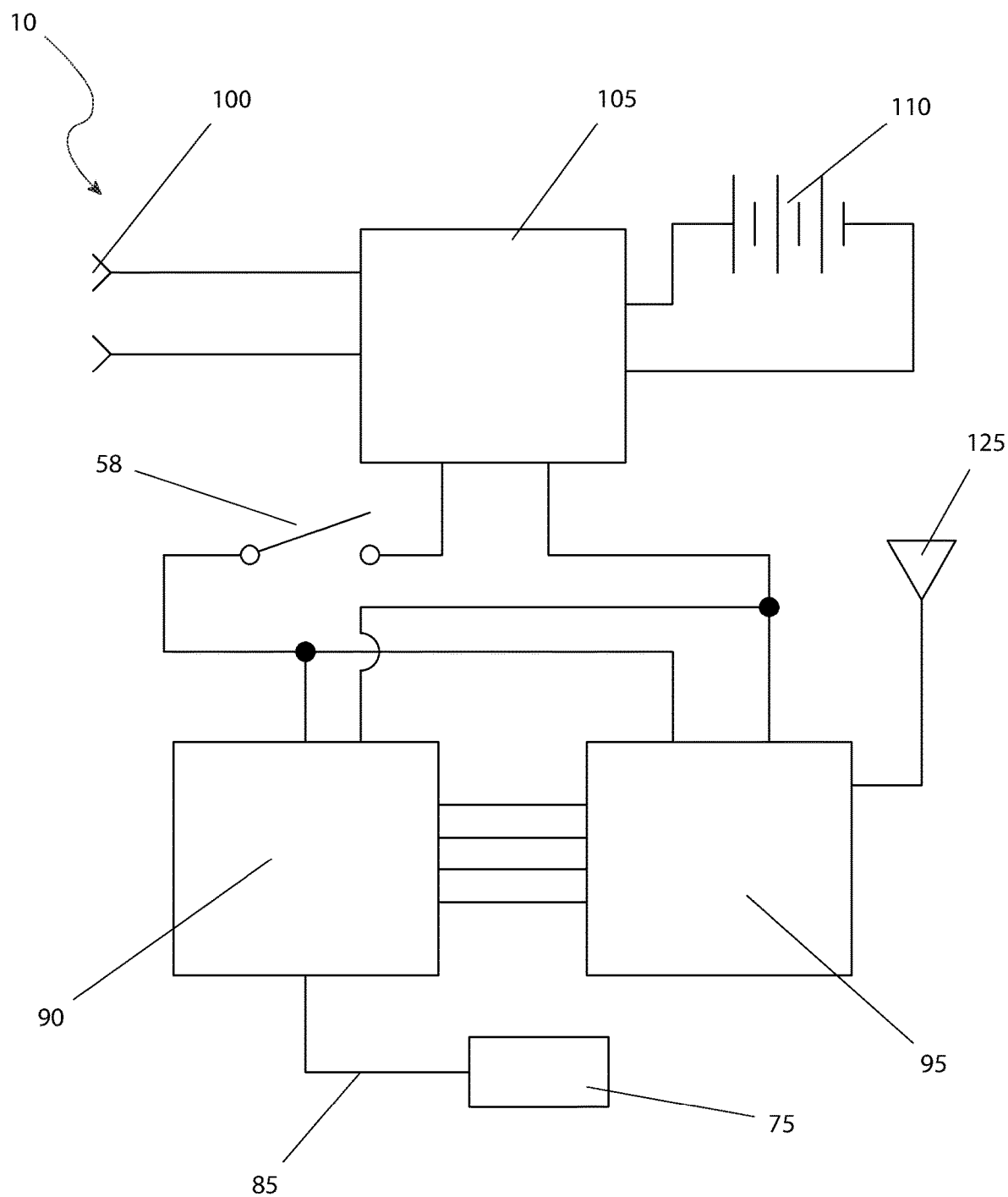

Referring to FIG. 5, an electrical block diagram of the device 10, according to the preferred embodiment of the present invention is depicted. Charging power is provided through the charging port 100 and is electrically connected to the charging regulator 105. The charging regulator 105 in turn provides a controlled voltage to charge the rechargeable battery 110. Additionally, the charging regulator 105 provides a constant voltage to the tester switch 58. When closed, the tester switch 58 provides operating current to the voltage comparator circuit 90 and the Bluetooth® transmitter 95. The voltage comparator circuit 90 receives the reference signal from the wire 50 (as shown in FIG. 4) via the high voltage cable 85. After processing, the necessary voltage reading 45 (as shown in FIG. 1) is passed to the Bluetooth® transmitter 95 for transmission via an internal Bluetooth® antenna 125. This resultant signal as transmitted by the Bluetooth® antenna 125 is picked up by the internal receiver of the mobile telephone 20 (as shown in FIG. 1) for display and subsequent use.

3. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as farm supply stores, electronic stores, home improvement stores, mechanical supply houses, mail order and internet supply houses and the like. Special attention would be paid to the preference for a dedicated application 40 on the mobile telephone 20 and/or the use of the alternate voltage readout 80 on the rear surface 60 of the protective outer enclosure 15.

During utilization of the device 10, the following procedure would be initiated: the user would place the wire 50 of the electric fence 55 into the wire channel 70 such that the wire 50 of tape contacts the electrode 75; the user then verifies the voltage level present on the wire 50 via the voltage reading 45 on the mobile telephone 20 via the application 40. This allows the user to make an informed decision on operation, repair, maintenance, and/or construction of the electric fence 55.

After use of the device 10, it is returned to a pocket, holster, purse or similar location where a mobile telephone 20 is typically stored on a user's person. This action keeps the protective outer enclosure 15 and the mobile telephone 20 at a readily accessible location where it can be easily retrieved when needed. Such action eliminates travel and wasted time retrieving a conventional electric fence tester thus improving efficiency and safety.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A case with integral electric fence testing device, comprising:

a protective outer enclosure configured to surround a mobile telephone, the protective outer enclosure having a plurality of outer sides and a protective rear surface, the protective rear surface having electrical insulating properties and including a wire channel configured to accept a wire of an electric fence;

an electrode disposed in a center portion of the wire channel and configured to contact the wire of the electric fence;

a high voltage cable electrically coupled to the electrode and extending to a voltage comparator circuit disposed within the protective outer enclosure;

a Bluetooth® transmitter configured to receive an output signal from the voltage comparator circuit and to wirelessly transmit the output signal to the mobile telephone;

a non-transitory storage media residing on the mobile telephone, the non-transitory storage media configured to display a voltage reading corresponding to a voltage present on the wire of the electric fence;

a tester switch electrically coupled to a rechargeable battery and configured to actuate the voltage comparator circuit and the Bluetooth® transmitter during a testing operation; and, a charging port aligned with a power jack of the mobile telephone and electrically connected to a charging regulator; the charging regulator configured to provide a controlled voltage to charge the rechargeable battery and a constant voltage to the tester switch; and, wherein the protective outer enclosure has an overall thickness greater than a conventional protective case to accommodate internal electrical components;

wherein the Bluetooth® transmitter is configured to interface with the non-transitory storage media to enable non-contact communication with the mobile telephone, thereby providing anti-shock protection to the mobile telephone and a user;

wherein the wire channel has a width of approximately one-half inch to accommodate electrified fence tape;

wherein the Bluetooth® transmitter is configured to transmit the voltage reading via an internal Bluetooth® antenna to an internal receiver of the mobile telephone to enable display and subsequent use;

wherein the tester switch is configured to be placed in an off position when not in use to conserve the rechargeable battery; and, wherein the protective outer enclosure includes a camera opening and one or more actuation buttons to allow operation of the mobile telephone in a conventional manner.

* * * * *